United States Patent [19]

Wendland

[11] 4,364,090

[45] Dec. 14, 1982

[54] METHOD FOR A COMPATIBLE INCREASE IN RESOLUTION IN TELEVISION SYSTEMS

[75] Inventor: Broder Wendland, Waltrop, Fed. Rep. of Germany

[73] Assignee: Licentia Patent-Verwaltungs-G.m.b.H., Frankfurt am Main, Fed. Rep. of Germany

[21] Appl. No.: 188,913

[22] Filed: Sep. 19, 1980

[30] Foreign Application Priority Data

Sep. 21, 1979 [DE]   Fed. Rep. of Germany ....... 2938349

[51] Int. Cl.³ .............................................. H04N 5/02
[52] U.S. Cl. ................................................. 358/140
[58] Field of Search ................. 358/140, 11, 160, 188, 358/242, 127, 128.37, 65

[56] References Cited

FOREIGN PATENT DOCUMENTS 2000413  1/1979  United Kingdom ................ 358/140

OTHER PUBLICATIONS

Dill, "High Resolution NTSC Television System," *IBM Technical Disclosure Bulletin*, vol. 21, No. 5, Oct. 1978, pp. 2148–2153.

*Primary Examiner*—John C. Martin
*Attorney, Agent, or Firm*—Spencer & Kaye

[57] ABSTRACT

Band limited standard video signals are sampled with line coupled sampling clock pulses. The sampling clock pulses are shifted from field to field by one-half a sampling interval. The sampling clock pulse rate is twice the frequency at the center of the Nyquist edge of the transmission channel. The received signal is sampled in synchronism, line coupled and offset from field to field. A video memory records the sampled values and furnishes them to the monitor at twice the sampling frequency and without flicker as a full frame. The video playback takes place at twice the line frequency or alternatively with the same line frequency and synchronous spot wobbling.

5 Claims, 8 Drawing Figures

WOBBLED LINES

METHOD FOR A COMPATIBLE INCREASE IN RESOLUTION IN TELEVISION SYSTEMS

BACKGROUND OF THE INVENTION

The invention relates to a method for a compatible increase in resolution in television systems for black and white and color picture transmission wherein the luminance signal of a signal source is scanned line by line with line interlacing and is limited by a transmitter lowpass filter.

The state of the art is defined by the presently used black and white systems as well as the PAL, SECAM and NTSC color television systems and is illustrated in the book entitled "Fernsehtechnik" [Television] by R. Theile published by Springer Verlag, Berlin-Heidelberg-New York, 1973.

These present-day television systems are not ideal with respect to fidelity in the reproduction of the transmitted images. The major drawbacks are, in particular, insufficient detail resolution, annoying line flicker, line travel and 25 Hz flicker along the horizontal outlines.

New system uses, such as video text, screen text, still picture transmission, home terminals, etc. cause these drawbacks to become even more evident. For example, television grid displays are almost unsuitable for computer graphics or for information retrieval. Considering the long-term outlook, however, a uniform display technique for all these cited uses seems to be desirable.

Morever, the trend to ever larger and brighter screens puts greater demands on detail resolution and freedom from flicker. The demand for increased detail resolution is especially applicable to large screen reproductions, e.g. with the aid of projection devices or on large planar displays.

SUMMARY OF THE INVENTION

It is the object of the invention to provide, by means of circuit arrangements in the television transmitter and in the television receiver, suitable prior and subsequent signal processing means which, with the existing transmission channel capacities and retained compatibility for existing receiver designs, improve the image quality on suitably equipped receivers. The solutions for this problem are described below.

The object is here to realize high detail resolution and avoid all flicker effects. For a monitor display on a conventional size screen this results in better legibility and less tiring reading, and for large-screen displays it becomes possible to use a larger field of observation at a greater distance which results in a substantial subjective increase in quality.

Advantageous embodiments of the solutions according to the invention can be found in the dependent claims.

The invention will now be explained in detail with the aid of the drawing figures.

DESCRIPTION OF THE PREFERRED EMBODIMENTS

Figure 1:
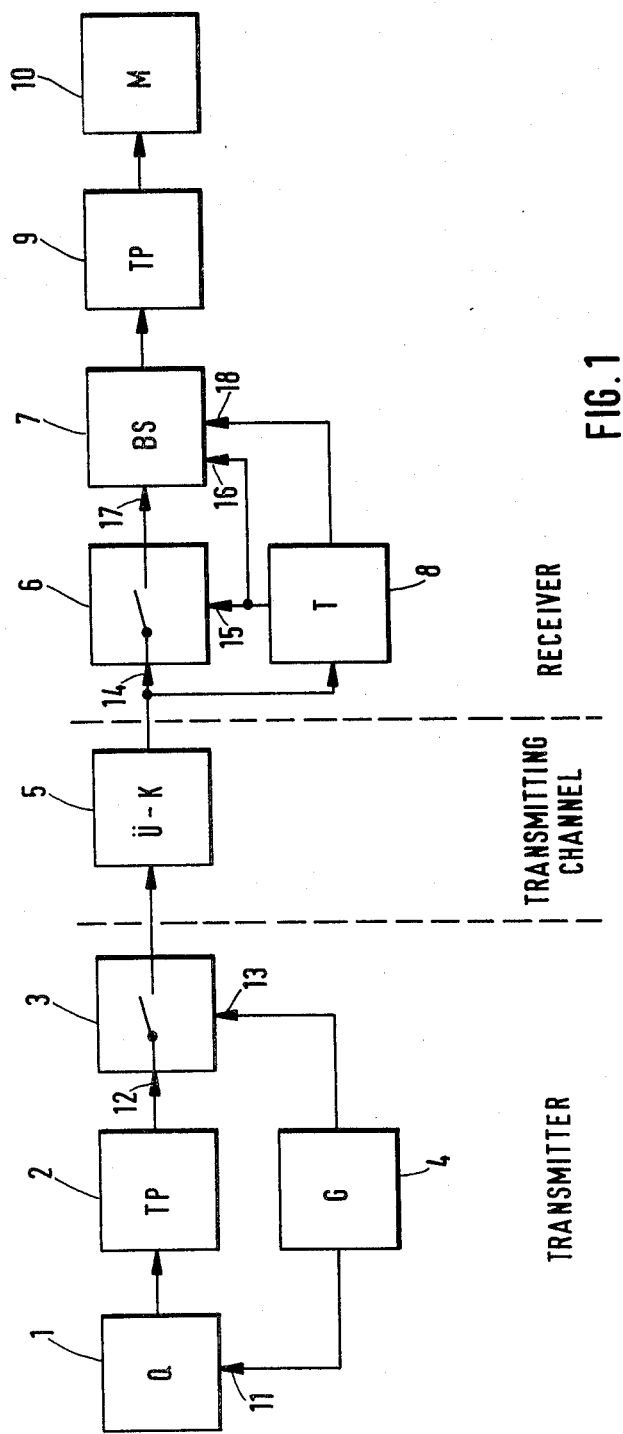
FIG. 1 is a block circuit diagram of an arrangement according to the invention.

FIG. 1 shows that at the transmitting end the luminance signal from a signal source 1 is fed to a transmitter lowpass filter 2 whose output signal is fed to the input 12 of a transmitter scanner sampling switch 3 and that a clock pulse generator 4 furnishes, on the one hand, synchronizing signals to the input 11 of the signal source 1 and, on the other hand, a line coupled sampling clock pulse to the input 13 of the transmitter sampling switch 3.

Figure 2:
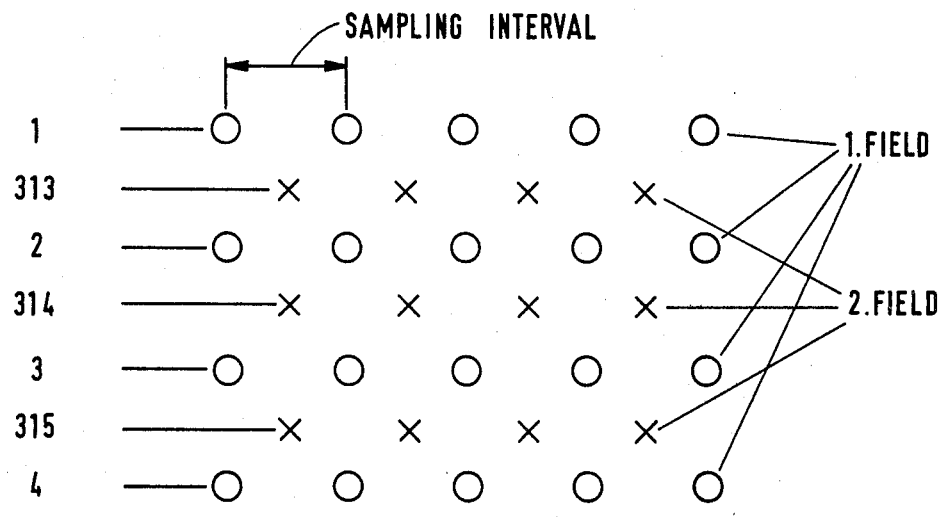
FIG. 2 is a pictorial view showing the spatial arrangement of scanned image points in a system according to the invention.

During the first field of a picture frame, the transmitter sampling switch 3 generates samples, and during the second field, it generates samples which are offset by one-half a sampling interval, or period, as shown in FIG. 2.

Figure 3:
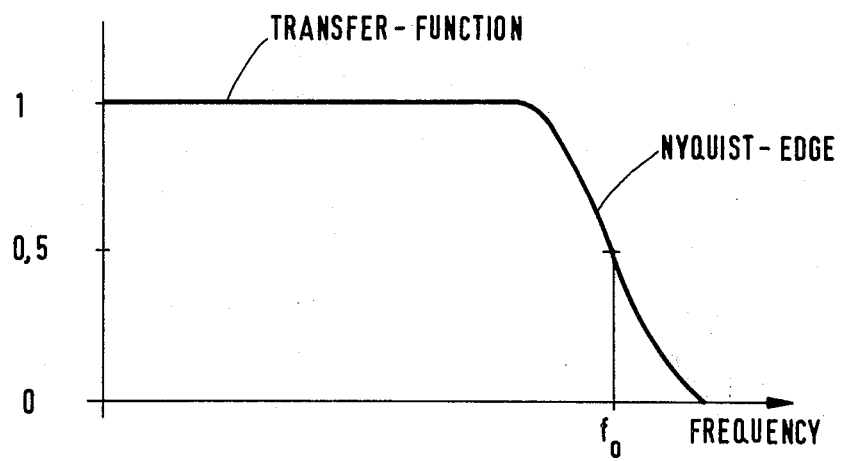
FIG. 3 is a diagram illustrating the transfer function of a transmission channel.

These samples are fed to a transmission channel 5 which exhibits a Nyquist edge centered at the frequency $f_O$ as shown in FIG. 3. The horizontal, or line, coupled sampling clock pulse frequency $f_T$ is twice as high as the frequency $f_O$ ($f_T = 2f_O$, Nyquist rate). At the receiving end, the synchronizing pulses in the received signal synchronize a clock pulse center 8, which generates sampling clock pulses in offset position corresponding to the clock pulse generator 4 and controls, via the input 15 of a sampling switch 6, the sampling of the received signals appearing at the input 14 of the switch 6 and furthermore via the input 16 the storing of the scanned values at the input 17 of a video memory 7. The clock pulse center 8 controls, via the input 18 of the video memory 7, the synchronization of the image storage and the twice as rapid image readout. The output signals from the video memory 7 are fed to a lowpass filter 9 whose lower limit frequency is twice as high as that of the lowpass filter 2 and the scanned values filtered by the lowpass filter 9 are fed to a monitor 10.

The source 1 may be, for example, a television camera, including a clock pulse generator which, in order to perform the method according to the invention, requires an additional output so as to furnish a line coupled sampling clock pulse in the offset position as shown in FIG. 2. The lowpass filter 2 is likewise realized by the conventional circuitry of such a camera. The effect of the required lowpass filter 2 can already be produced by the camera.

Figure 7:
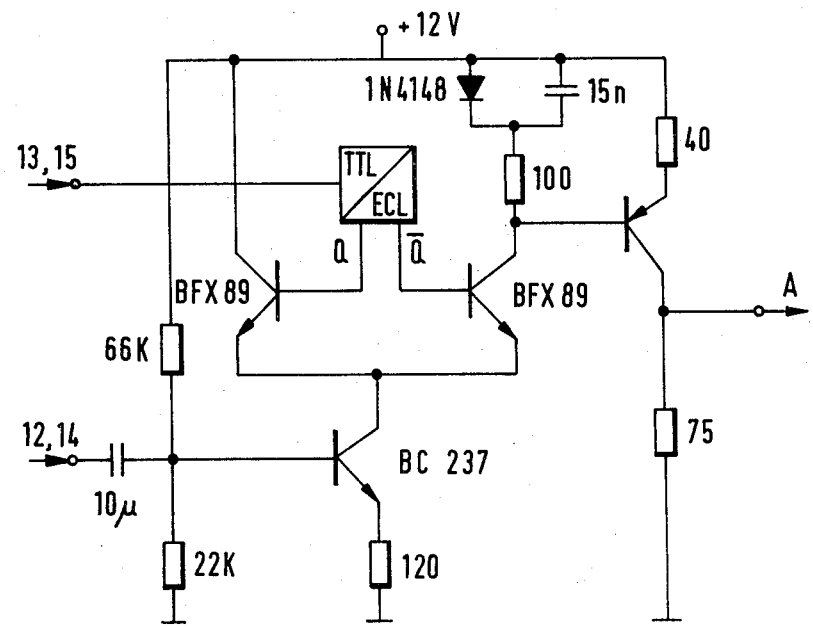
FIG. 7 is a circuit diagram of a scanner which can be used in a system according to the invention.

FIG. 7 shows a sampling switch as it is used to practice the method according to the invention as the transmitter switch 3 as well as the receiver switch 6.

Figure 4:
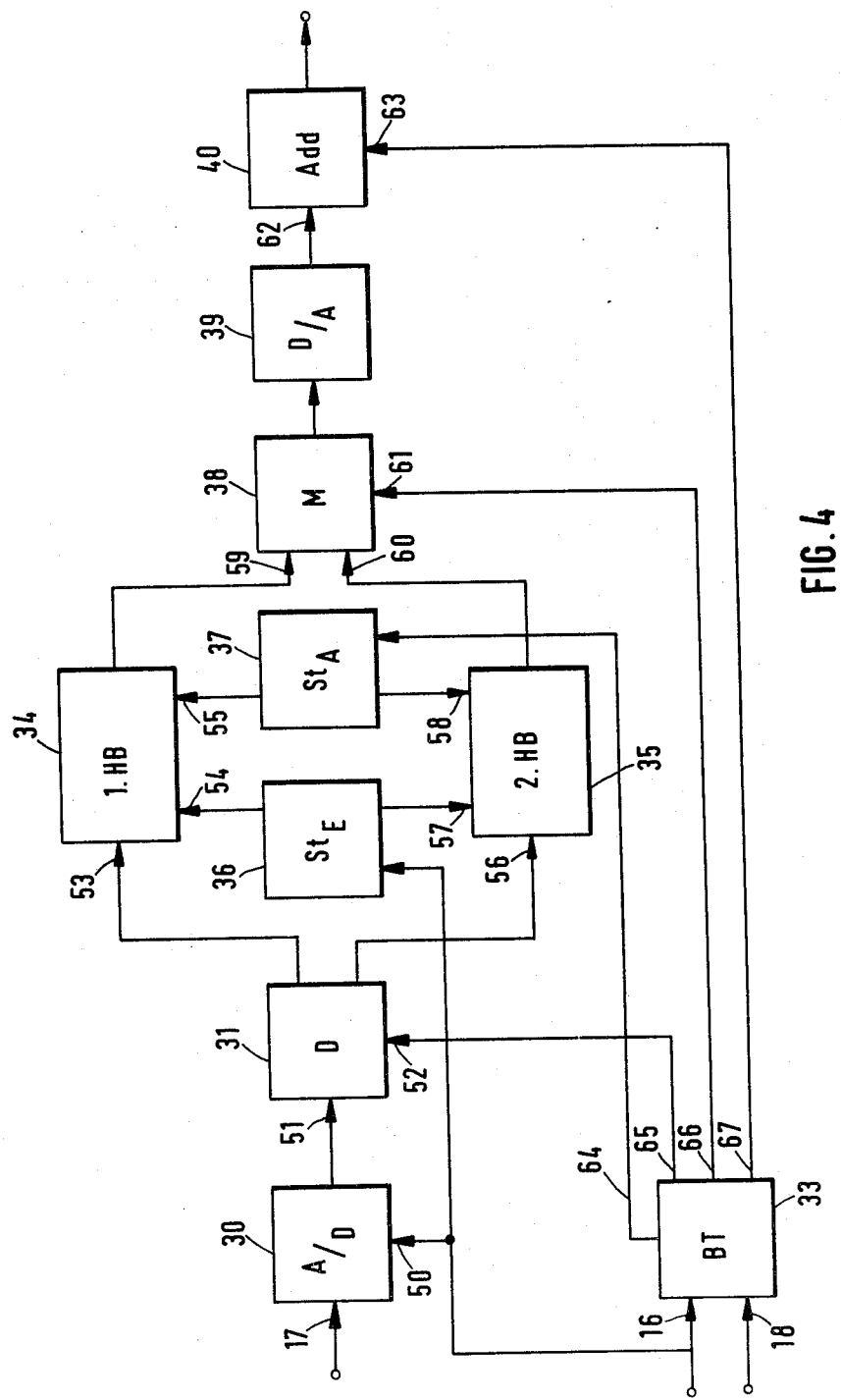
FIG. 4 is a block circuit diagram of a first embodiment of a video memory which can be employed in a system according to the invention.
Figure 5:
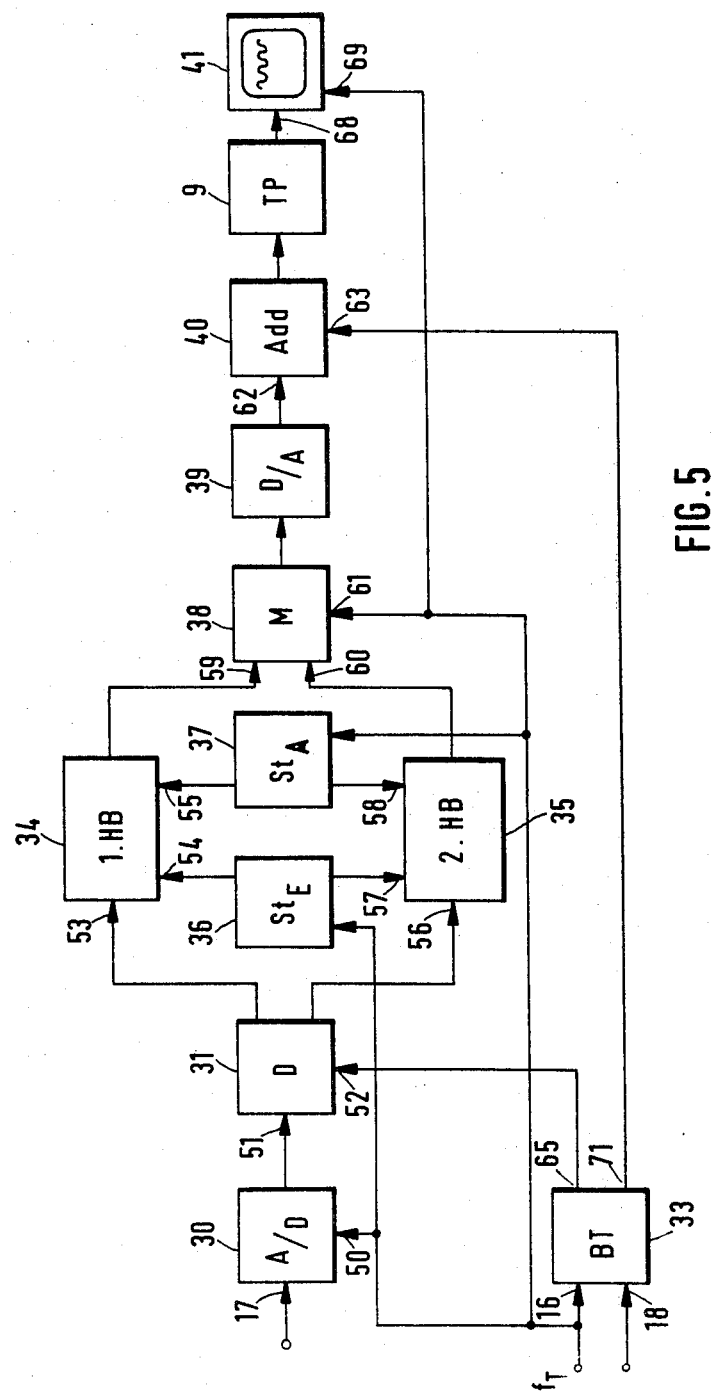
FIG. 5 is a view similar to that of FIG. 4 of a second embodiment of the video memory.

With a suitable analog/digital converter 30, shown in FIGS. 4 and 5, having a sufficiently small sampling time (about 1 nsec), the receiver switch 6 could be omitted.

A favorable embodiment of the flicker free image reproduction with increased resolution employs the video memory of FIG. 4. The video memory according to FIG. 4 receives, at the input 17 of the analog/digital converter 30, the scanned, or sampled, values of the received signal. From the sampling clock pulse at frequency $f_T$ at input 16 and from the image synchronizing signal at input 18 the video memory clock pulse center 33 generates at its output 64 the readout clock pulse whose frequency is twice that of the sampling clock pulse. This clock pulse is coupled with the field clock pulse at the output 65 and with the line frequency pulse at the output 66 and with the synchronous mixture for the twice as fast, or double frequency, readout at the output 67.

The sampling clock pulse at the input 16 of the video memory clock pulse center 33 is fed to the gating input 50 of the analog/digital converter 30. The digital output signals of the analog/digital converter 30 are fed, via the input 51 to a demultiplexer 31 whose second input 52 receives the field clock pulse from the video memory clock pulse center.

The signals associated with the first field are fed, via the input 53 to a first field memory 34 and the signals associated with the second field are fed to a second field memory 35.

A read-in control 36 which receives at its input the sampling clock pulse of the input signal at the input 16 of the video memory clock pulse center, generates the memory addresses and control instructions associated with the respective fields.

These memory addresses are fed to the input 54 or 57, respectively, of the field memory 34 or 35, respectively. A readout control 37, which receives at its input the readout clock pulse at twice the frequency of the sampling clock pulse from the output 64 of the video memory clock pulse center 33, generates the memory addresses and control instructions associated with the respective lines to be read out.

These memory addresses are fed to the input 55 or 58, respectively of the field memory 34 or 35, respectively. At the outputs of the two field memories there appear, in succession, during the line duration of a stored line, one line of the first field and one line of the second field.

These output signals from the two field memories are fed to the respective inputs 59 and 60 of a multiplexer 38. At the input 61 of the multiplexer 38 there appears the line frequency pulses from the output 66 of the video memory clock pulse center 33. The output signal of the multiplexer 38 is fed to a digital/analog converter 39 whose output signal is fed to one input 62 of an adder stage 40 whose other input 63 receives the synchronous mixture for the double frequency readout from the output 67 of the video memory clock pulse center 33 and furnishes at its output the corrected video signal to the lowpass filter 9 of FIG. 1 at tiwce the line frequency and at the image, or field, frequency so as to produce an entire frame.

In cases where a change of the line frequency is impossible or not desirable, the configuration according to FIG. 5 represents a favorable embodiment for a flicker free increase in resolution. The video memory according to FIG. 5 receives the sampled values of the received signals at the input 17 of the analog/digital converter 30. The video memory clock pulse center 33 generates from the sampling clock pulse $f_T$ at the input 16 and from the image synchronizing signal at the input 18 the field clock pulse at the output 65 and the synchronous mixture at the output 71; the sampling clock pulse at the input 16 of the video memory clock pulse center 33 is fed to the input 50 of the analog/digital converter 30.

The digital output signals of the analog/digital converter 30 are fed, via the input 51, to a demultiplexer 31 whose second input 52 receives the field clock pulse from the video memory clock pulse center.

The signals associated with the first field are fed, via the input 53 to the first field memory 34 and the signals associated with the second field are fed, via the input 56 to the second field memory 35.

The write-in control 36, which receives at its input the sampling clock pulse of the input signal at the input 16 of the video memory clock pulse center, generates the memory addresses and control instructions associated with the respective fields.

These memory addresses are fed to the input 54 or 57, respectively, of the field memory 34 or 35, respectively.

The read-out control 37, whose input receives the sampling clock pulse, generates the memory addresses and control instructions associated with the respective lines to be read out.

These memory addresses are fed to the input 55 or 58, respectively, of the field memory 34 or 35, respectively. At the respective outputs of the two field memories there appears a line of the first field and a line of the second field, respectively. These output signals of the two field memories are fed to the respective inputs 59 and 60 of the multiplexer 38. The sampling clock pulse $f_T$ appears at the input 61 of the multiplexer 38 and alternatingly switches to its output a point of a line from the first field and the adjacent point of the next locally adjacent line of the other field. If the line frequency is the same, this causes all image points of both fields to appear at the output of the multiplexer during the duration of one field.

Figure 6:
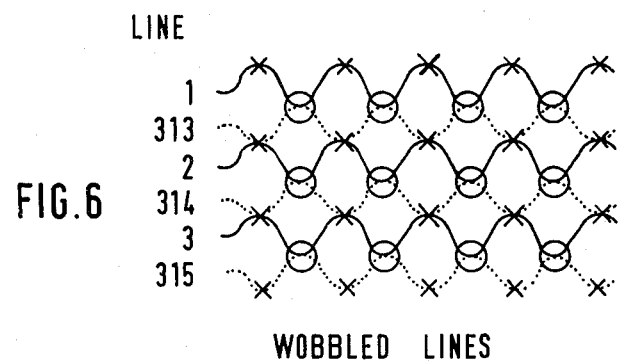
FIG. 6 is a pictorial view showing the spatial arrangement of the image points on a monitor when the playback beam is wobbled according to the invention.

The output signal of the multiplexer 38 is fed to a digital/analog converter 39 whose analog output signal is fed to the input 62 of an adder stage 40 which receives at its other input 63 the synchronous mixture at the output 71 of the video memory clock pulse center 33 and furnishes at its output the corrected video signal to the lowpass filter 9. The lowpass limited signal is fed to the input 68 of the monitor 41 which can be wobbled to trace the picture elements of two lines in alternation and the sampling clock pulse $f_T$ is fed to the input 69 of the monitor 41. The sampling clock pulse $f_T$ synchronizes the wobbling circuitry of the monitor and the spot of the playback beam in the monitor 41 is additionally wobbled vertically as shown in FIG. 6.

In those cases where an increase in the line frequency in the monitor is impossible or not desirable, the method according to the invention therefore proposes to wobble the electron beam of the video tube by means of a device, e.g., a magnetic field, in such a way that during one line sweep the image points of one line appear at the appropriate locations and the image points of the adjacent lines are locally vertically offset therefrom.

The above circuit arrangement for increasing resolution can also be used with advantage for video recording and playback and for video telephone systems.

Figure 8:
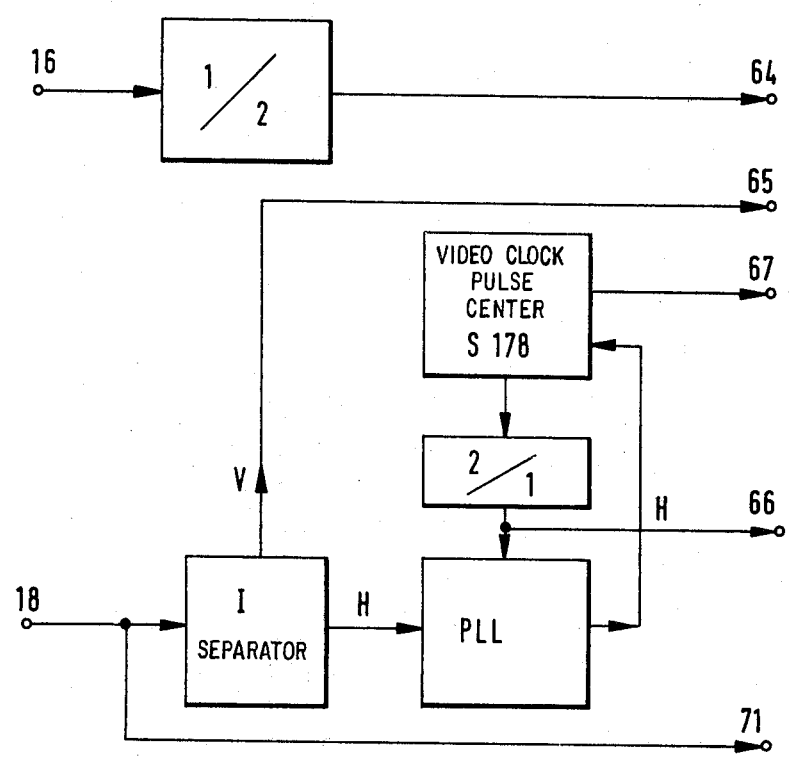
FIG. 8 is a block circuit diagram of a video memory clock pulse center which can be used in a system according to the invention.

The video memory clock pulse center is constructed, for example, as shown in FIG. 8.

A conventional frequency doubling circuit is disposed between the input 16 and the output 64. The input 18 is connected to a pulse separating stage whose horizontal output H leads to a phase locked loop circuit (PLL) having an output frequency of 2 MHz whose output actuates a video clock pulse center marketed under the name "Video-Taktzentrale" S 178 by Siemens AG. This clock pulse center is additionally actuated by the vertical output V of the pulse separating stage.

From the actuating signals, the video clock pulse center generates the synchronous mixture at the output 67 at double the line scanning frequency and at the same video frequency and makes available to the PLL circuit, via an additional 2:1 frequency divider, the horizontal comparison pulses which the PLL circuit synchronizes with the horizontal pulses from the pulse separating stage. The horizontal pulses from the additional 2:1 frequency divider are fed to the output 66. The input 18 to which is fed the vertical synchronizing signal is connected directly with the output 71. The vertical signal from the pulse separating stage is fed to the output 65. The terminals are identified in the same manner as in FIGS. 1, 4 and 5.

I claim:

1. A method for effecting a compatible increase in resolution in a television signal transmission system having a transmitting end and a receiving end and in which the luminance signal is scanned line by line, with line interlacing, to divide each picture frame into two fields, and the signal is limited at the transmitting end by a lowpass filter, the transmitting and receiving ends being coupled together by a transmission channel having an upper cutoff frequency defined by a Nyquist edge, said method comprising: at the transmitting end, sampling elements of successive lines of each field, with the sampled elements of one field being offset in the line scanning direction from those of the immediately succeeding field, the sampling of successive lines being controlled by a sampling clock pulse train at a frequency which is in synchronism with the line scanning frequency of the system and which is twice as high as the frequency at the Nyquist edge of the transmission channel; and, at the receiving end, sampling the signal received from the transmitting end in synchronism with the sampling clock pulse train at the transmitting end and delayed by the delay time of the transmission channel;

separately storing the sampled signals associated with the two fields of each picture frame in accordance with the time of their occurrence;

alternatingly reading out from storage and combining the sampled signals of immediately adjacent lines of a complete picture frame at twice the rate at which they are stored during said step of storing to provide signals of successive lines of a complete frame at twice the line frequency and at the frame frequency of the scanning at the transmitting end;

after reading out the signals of each line, again storing those signals so that during the time of storing of the signals associated with a frame, the stored signals associated with the two corresponding fields are read out twice; and converting the read-out signals to analog form and combining them with synchronizing signals.

2. A method for effecting a compatible increase in resolution in a television signal transmission system having a transmitting end and a receiving end and in which the luminance signal is scanned line by line, with line interlacing, to divide each picture frame into two fields, and the signal is limited at the transmitting end by a lowpass filter, the transmitting and receiving ends being coupled together by a transmission channel having an upper cutoff frequency defined by a Nyquist edge, said method comprising: at the transmitting end, sampling elements of successive lines of each field, with the sampled elements of one field being offset in the line scanning direction from those of the immediately succeeding field, the sampling of successive lines being controlled by a sampling clock pulse train at a frequency which is in synchronism with the line scanning frequency of the system and which is twice as high as the frequency at the Nyquist edge of the transmission channel; and, at the receiving end, sampling the signal received from the transmitting end in synchronism with the sampling clock pulse train at the transmitting end and delayed by the delay time of the transmission channel;

separately storing the sampled signals associated with the two fields of each picture frame in accordance with the time of their occurrence;

alternatingly reading out from storage successive sampled signals of immediately adjacent lines of a complete picture frame in the sequence of one sampled signal of one field followed by the next succeeding sampled signal of the immediately succeeding line of a complete picture frame, which next succeeding line forms part of the other field, said reading out occurring at twice the speed at which the sampled signals are stored, and combining the sampled signals into a single signal in the order in which they are read out;

after reading out the sampled signals of each line, again storing those signals in such a manner that during the time of storing of the signals associated with a frame, the stored signals associated with each field are read out twice and the read out signals occupying one line scanning period contain alternatingly the image points of two immediately adjacent lines of a complete picture frame; and converting the read-out signals to analog form and combining them with synchronizing signals, and supplying the combined signals to a monitor constructed to produce a cathode ray beam which is wobbled vertically in such a way that during each line sweep the elements of one line of the received signal are displayed at selected locations and the elements of the immediately adjacent line of a complete frame are displayed at locations vertically offset therefrom.

3. A circuit arrangement for effecting a compatible increase in resolution in a television signal transmission system having a transmitting end and a receiving end and in which the luminance signal is scanned line by line, with line interlacing to divide each picture frame into two fields, the transmitting and receiving ends being coupled together by a transmission channel having an upper cutoff frequency defined by a Nyquist edge, said circuit arrangement comprising: at the transmitting end, a transmitter lowpass filter connected for passing low frequency components of the scanned luminance signal;

a transmitter sampling switch having a signal input connected to receive the luminance signal components passed by said filter, a control input, and an output connected to the transmission channel; and a clock pulse generator connected to said switch control input for supplying thereto sampling clock pulses at a frequency which is in synchronism with the line scanning frequency of the system and is twice the frequency at the Nyquist edge of the transmission channel for causing said switch to sample successive elements of the luminance signal at the clock pulse frequency and to supply to its output a transmitter signal containing synchronizing pulses and signal samples representative of successively sampled elements of successive lines of each field, with the sampled elements of one field being offset in the line scanning direction from those of the immediately succeeding field by an amount equal to one-half the sampling clock pulse period, said clock pulse generator further providing synchronizing signals; and at the receiving end, a receiver input connected to the transmission channel to receive the transmitter signal;

means defining a receiver clock pulse center having a synchronizing input connected to said signal input, and first and second outputs, and controllable by the synchronizing pulses in the transmitter signal to supply to its first output receiver sampling pulses at the same frequency as, and delayed in time relative to, the sampling clock pulses supplied by said clock pulse generator;

a receiver sampling switch having a signal input connected to said receiver input, a signal output, and a control input connected to said first output of said receiver clock pulse center for sampling the transmitter signal in response to each receiver sampling pulse;

a video memory having a signal input connected to receive the sampled signals appearing at said receiver sampling switch output, a signal output, and two control inputs connected to said control outputs of said receiver clock pulse center for separately reading into said memory the sampled signals associated with the two fields of each picture frame in accordance with the time of their occurrence, alternately reading out from storage and combining, at its said signal output, the read-in sampled signals of immediately adjacent lines of a complete picture frame at twice the rate at which they are read-in to provide signals of successive lines of a complete frame at the frame frequency of said step of scanning at the transmitting end, and, after once reading out the signals of each line, again reading-in those signals so that during the time of reading-in of the signals associated with a frame, the read-in signals associated with each field are read out twice; and a receiver lowpass filter having an upper cutoff frequency twice that of said transmitter lowpass filter and connected to receive the signals appearing at said video memory signal output, and a television monitor connected to receive, and produce a display based on, the signals passed by said receiver lowpass filter.

4. Circuit arrangement according to claim 3, wherein said video memory comprises:

at its input, an analog/digital converter connected to convert each received signal appearing at said video input into a digital signal representative of the value of the respective sampled signal, said converter having a control input connected to said first control output of said receiver clock pulse center;

a demultiplexer having an input connected to the output of said analog/digital converter and provided with a control input and two signal outputs;

a video memory clock pulse center having a first output connected to said demultiplexer control input and supplying pulses at the picture field clock pulse frequency, said video memory clock pulse center further having a second input supplying pulses at a frequency of twice the sampling clock pulses, a third output supplying pulses at the line clock pulse frequency, and a fourth output supplying synchronizing signals for said monitor;

two field memories each having a signal input connected to a respective signal output of said demultiplexer;

field memory read-in control means connected to said first output of said receiver clock pulse center and to said field memories for causing the digital signals associated with a respective field to each picture frame to be read into a respective field memory;

field memory read-out control means connected to said second output of said video memory clock pulse center and to said field memories for causing digital signals to be read out of said field memories alternatingly at the frequency of the pulses supplied by said second output of said video memory clock pulse center;

a multiplexer having two inputs each connected to the output of a respective field memory, and having a control input connected to said third output of said video memory clock pulse center;

a digital/analog converter having a signal input connected to the output of said multiplexer for converting each digital signal supplied thereto into an analog signal sample;

an adder stage having a first input connected to the output of said digital/analog converter, a second input connected to said fourth output of said video memory clock pulse center, and an output connected to supply the signals at its first and second inputs to said receiver lowpass filter.

5. Circuit arrangement according to claim 3, wherein said video memory comprises:

at its input an analog/digital converter connected to convert each received signal appearing at said video input into a digital signal representative of the value of the respective sampled signal, said converter having a control input connected to said first control output of said receiver clock pulse center;

a demultiplexer having an input connected to the output of said analog/digital converter and provided with a control input; and two signal outputs;

a video memory clock pulse center having a first output connected to said demultiplexer control input and supplying pulses at the picture field clock pulse frequency, and a second output supplying synchronizing signals for said monitor;

two field memories each having a signal input connected to a respective signal output of said demultiplexer;

field memory read-in control means connected to said first output of said receiver clock pulse center and to said field memories for causing the digital signals associated with a respective field to each picture frame to be read into a respective field memory;

field memory read-out control means connected to said first control input of said receiver clock pulse center and to said field memories for causing digital signals to be read out of said field memories alternatingly at the frequency of the receiver sampling pulses;

a multiplexer having two inputs each connected to the output of a respective field memory, and having a control input connected to said first control input of said receiver clock pulse center;

a digital/analog converter having a signal input connected to the output of said multiplexer for converting each digital signal supplied thereto into an analog signal sample; and an adder stage having a first input connected to the output of said digital/analog converter, a second input connected to said second output of said video memory clock pulse center, and an output connected to supply the signals at its first and second inputs to said receiver lowpass filter, and said monitor comprises means for vertically wobbling the display beam and having a wobble control input connected to said first control input of said receiver clock pulse center.

* * * * *